(12) United States Patent
Zander (10) Patent No.: US 8,376,333 B2
(45) Date of Patent: Feb. 19, 2013

(54) MECHANICAL JIG

(76) Inventor: Peter Jackson Zander, Katonah, NY (US)

(*) Notice: Subject to any disclaimer, the term of this patent is extended or adjusted under 35 U.S.C. 154(b) by 759 days.

(21) Appl. No.: 12/413,522

(22) Filed: Mar. 28, 2009

(65) Prior Publication Data

US 2010/0244342 A1   Sep. 30, 2010

(51) Int. Cl.
| | |
|---|---|
| B25B 3/00 | (2006.01) |
| B25B 1/20 | (2006.01) |
| B23B 47/28 | (2006.01) |
| B23B 49/02 | (2006.01) |
| B23B 45/14 | (2006.01) |
| B23B 47/00 | (2006.01) |
| B23B 49/00 | (2006.01) |
| B23G 1/48 | (2006.01) |
| B23G 1/00 | (2006.01) |

(52) U.S. Cl. ............... 269/1; 269/41; 408/115 R; 408/97
(58) Field of Classification Search ................. 269/1, 2, 269/41; 408/115 R, 97, 1 R, 241 G, 108, 408/103

See application file for complete search history.

(56) References Cited

U.S. PATENT DOCUMENTS

| | | | | |
|---|---|---|---|---|
| 2,798,520 A | * | 7/1957 | Maskulka et al. | 408/241 G |
| 3,345,679 A | * | 10/1967 | Anderson | 16/392 |
| 3,938,796 A | * | 2/1976 | Wynn | 269/2 |
| 4,137,003 A | | 1/1979 | Budoff | |
| 4,176,989 A | * | 12/1979 | Wolff | 408/115 R |
| 4,257,166 A | * | 3/1981 | Barker et al. | 408/241 G |
| 4,421,442 A | * | 12/1983 | Lindblad | 408/115 R |
| 4,443,138 A | | 4/1984 | Butera | |
| 4,474,514 A | * | 10/1984 | Jensen | 408/115 R |
| 4,501,033 A | * | 2/1985 | Kessel et al. | 5/200.1 |
| 4,594,032 A | * | 6/1986 | Warburg | 408/115 R |
| 4,752,162 A | * | 6/1988 | Groh | 408/115 R |
| 4,783,189 A | | 11/1988 | Bugg | |
| 4,952,101 A | * | 8/1990 | Coombs | 408/115 R |
| 4,984,775 A | * | 1/1991 | Kahlke | 269/41 |
| 5,024,564 A | | 6/1991 | Lloyd | |
| 5,056,966 A | * | 10/1991 | Lee | 408/115 R |
| 5,158,406 A | * | 10/1992 | Ulinskas | 408/115 R |
| 5,174,693 A | * | 12/1992 | Lee et al. | 408/108 |
| 5,362,082 A | * | 11/1994 | Kornberg | 280/304.1 |
| 5,407,307 A | * | 4/1995 | Park | 408/115 R |
| 5,466,098 A | | 11/1995 | Juang | |
| 5,590,986 A | * | 1/1997 | Juang | 408/115 R |
| 5,791,835 A | * | 8/1998 | Chiang et al. | 408/115 R |
| 5,807,036 A | * | 9/1998 | Lostlen | 408/97 |
| 5,881,514 A | | 3/1999 | Pryor | |
| 5,954,461 A | * | 9/1999 | Lemieux | 408/115 R |
| 6,116,826 A | * | 9/2000 | Benway | 408/1 R |
| 6,123,126 A | | 9/2000 | Shanahan et al. | |

(Continued)

*Primary Examiner* — Lee D Wilson
*Assistant Examiner* — Alvin Grant
(74) *Attorney, Agent, or Firm* — Brian B. Shaw, Esq.; Jodi A. Reynolds, Esq.; Harter Secrest & Emery LLP (57) ABSTRACT

A jig for drilling intersecting holes in a work piece. The jig comprises a base for supporting the work piece and a first template operatively coupled to the base and having a bolt-hole guide located along a first axis of the template, the bolt-hole guide having a diameter sized to receive a first drill bit. The jig also includes a second template operatively coupled to the base and having a barrel-nut hole guide located along a second axis of the template, perpendicular and intersecting the first axis. The barrel-nut hole guide has a diameter larger than the diameter of the bolt-hole guide and is sized to receive a second drill bit.

10 Claims, 7 Drawing Sheets

U.S. PATENT DOCUMENTS

| | | |
|---|---|---|
| 6,220,796 B1 * | 4/2001 | Chiang .................. 408/115 R |
| 6,244,794 B1 * | 6/2001 | Lindsay .................. 408/103 |
| 6,244,795 B1 * | 6/2001 | Fenelon .................. 408/115 R |
| 6,363,982 B1 | 4/2002 | Nixon, Jr. |
| 6,394,713 B1 * | 5/2002 | Yates, Sr. .................. 408/115 R |
| 6,405,916 B1 | 6/2002 | Olden |
| 6,457,923 B1 | 10/2002 | Grossman |
| 6,491,073 B1 | 12/2002 | Essick |
| 6,499,224 B1 | 12/2002 | Asick |
| 6,532,713 B2 | 3/2003 | Katayama et al. |
| 6,659,695 B2 * | 12/2003 | Park .................. 408/103 |
| 6,799,615 B2 | 10/2004 | Smith |
| 7,189,034 B1 * | 3/2007 | Zeilinger et al. .................. 408/1 R |
| 7,189,035 B2 * | 3/2007 | Miro .................. 408/115 R |
| 7,726,916 B2 * | 6/2010 | MacKenzie Turner et al. 408/97 |
| 8,147,172 B2 * | 4/2012 | Quinn .................. 408/115 R |
| 2002/0136591 A1 * | 9/2002 | Callahan .................. 403/188 |
| 2003/0196726 A1 | 10/2003 | Tucker et al. |
| 2003/0205011 A1 | 11/2003 | Bequet |
| 2005/0056344 A1 | 3/2005 | Freidlund |
| 2006/0251481 A1 * | 11/2006 | Behman .................. 408/115 R |

* cited by examiner

MECHANICAL JIG

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates generally to a mechanical jig for drilling intersecting holes in a work piece, and more particularly for a jig having a bolt-hole guide aligned along a first axis and a barrel-nut guide having a diameter greater than the bolt-hole guide and aligned along a second axis, which is perpendicular and intersecting to the first axis.

2. Description of Related Art

A mortise and tenon joint is a traditional joint often used to join together two pieces of wood. This joint creates a strong connection between the two pieces that are frequently at right angles to one another. This joint is preferred for a broad range of applications from making fine furniture to assembling massive timber frames for barns and homes. A mortise and tenon joint is typically made by reducing one piece of wood to create a protruding portion called the tenon. A second piece of wood is bored and chiseled to form a hole, or a mortise, identical in size to the tenon. Both the mortise and the tenon are then trimmed until the pieces of wood can slide together snuggly. A hole can be bored through the tenon and a peg can be inserted there through to lock the joint in place.

A problem with the mortise and tenon joint is that the wood must be straight-grained stock to avoid breakage, resulting from stress on the joint. Further, excess material is required because the length of the frame pieces must include the tenon which is disposed within another frame piece. Another problem with the mortise and tenon joint is that it requires a large amount of preparation time to produce the joint, including requiring several calculations and drawing layouts. Further, a significant amount of skill and experience is required to create such a joint. While specialty tools, such as chain mortisers and horizontal boring machines, can create these joints more quickly, they require a significant investment because the tools are expensive.

What is needed then is a jig that allows one to replace the mortise and tenon joint with a joint secured with hardware. Also, a jig that allows one to locate and drill holes in wood pieces that are perpendicular and intersecting without requiring specialty tools or significant experience in the woodworking industry and the need to calculate and layout each drilling location.

BRIEF SUMMARY OF THE INVENTION

A jig for drilling intersecting holes in a work piece comprises a body having at least one bolt-hole guide located along a first axis of a first portion of the body and at least one barrel-nut hole guide located along a second axis of a second portion of the body. The second axis of the barrel-nut guide is perpendicular and intersecting to the first axis. The diameter of the barrel-nut hole guide is larger than the diameter of the bolt-hole guide. The jig can include a second barrel-nut hole guide located along a third axis of a second portion of the body, wherein the third axis is parallel to the second axis and perpendicularly intersecting the first axis. The second barrel-nut hole guide has a diameter that is greater than the bolt-hole guide diameter. Preferably, the first and second barrel-nut hole guides are the same size. The bolt-hole guides and the barrel-nut hole guides further include bushings.

In one configuration, the jig is L-shaped and includes edges that align with a portion of a perimeter of the work piece. A person skilled in the art will be able to determine the size necessary to align the edges of the body with the work piece. In one embodiment, the body is the width of a rail or stile for frame-and-panel construction cabinetry.

The present invention further provides a jig for drilling intersecting holes in a work piece comprising a base for supporting the work piece and a first and second template operatively coupled to the base. The first template includes a bolt-hole guide located along a first axis of the template. The bolt-hole guide has a diameter sized to receive a first drill bit. The second template has a barrel-nut hole guide located along a second axis of the template, which is perpendicular and intersecting the first axis. The barrel-nut hole guide has a diameter larger than the diameter of the bolt-hole guide and is sized to receive a second drill bit.

In one embodiment, the first and second templates are moveable along two orthogonal axes of the base. The first and second templates each comprise a dove tail joint engaging a dove tail groove located along a portion of a perimeter of the base. Preferably, the first and second templates are releasably secured to the base by locking mechanism. The first and second templates include upper sets of bolt-hole guides and corresponding barrel-nut hole guides, wherein the individual guides in each of the upper sets are disposed at different heights from a top portion of the base to accommodate different work piece thicknesses. The first and second templates also include lower sets of bolt-hole guides and corresponding barrel-nut guides, wherein the individual guides in each of the lower sets are disposed at different heights from a bottom portion of the base to accommodate different work piece thicknesses. Preferably, each of the upper sets is disposed at the same height from the upper portion of the base and each of the lower sets is disposed at the same height from the lower portion of the base.

In another embodiment, the first and second templates include blocks coupled to first and second portions of the first and second template. The blocks include apertures arranged to receive drill bits. Preferably, the first and second templates are moveable along three mutually orthogonal axes of the base.

In use, the operator positions a first portion and a second portion of the jig on a first side and a second side of the work piece, respectively. Then, the operator inserts a first drill bit into a bolt-hole guide in the first portion of the jig and drills a first bolt-hole into the work piece. The operator inserts a second drill bit into a barrel-nut hole guide in the second portion of the jig drills a first barrel-nut hole into the work piece, wherein the first barrel-nut hole perpendicularly intersects with the first bolt-hole and is greater in diameter than the first bolt-hole.

In another embodiment, the operator positions a work piece on a base, adjusts a height of the base to locate a first block and a second block along a first portion and a second portion of the work piece, respectively, drills a first bolt-hole into the work piece and then drills a first barrel-nut hole into the work piece. The first barrel-nut hole corresponds to the first bolt-hole, wherein the first bolt-hole and the first barrel-nut hole are perpendicular and intersecting.

The invention will now be described in detail in terms of the drawings and the description which follow.

DETAILED DESCRIPTION OF THE INVENTION

Referring to the Figures, FIGS. 1-4 show an embodiment of the present invention showing a jig 10 which provides a template for drilling intersecting holes in a work piece 12. A bolt 14 and a barrel-nut 16 are then inserted into each set of intersecting holes to fasten two portions 18, 20 of the work piece 12 together. The jig 10 includes a body 22 having two template portions 18, 20, wherein the two template portions 18, 20 are arranged in an L-shaped configuration. The body 22 is preferably constructed of hard plastic, aluminum or injection molded plastic. In an embodiment of the invention, the body 22 can include two separate, but contiguous template portions 18, 20. Alternatively, the template portions 18, 20 can be an integral part of the body 22.

Figure 1:
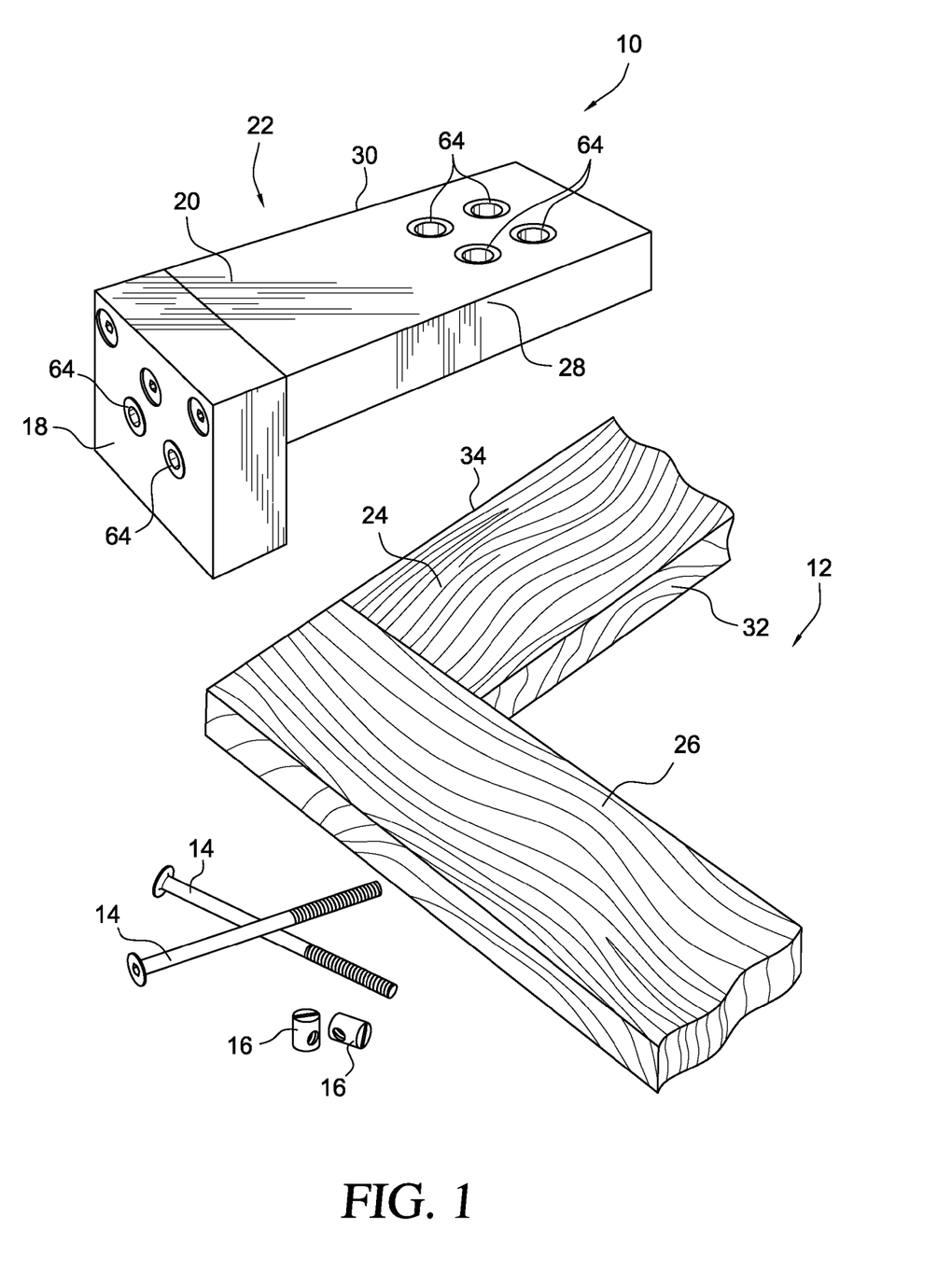
FIG. 1 is a perspective view of a jig for drilling intersecting holes in a work piece for the insertion of a bolt and barrel-nut.
Figure 2:
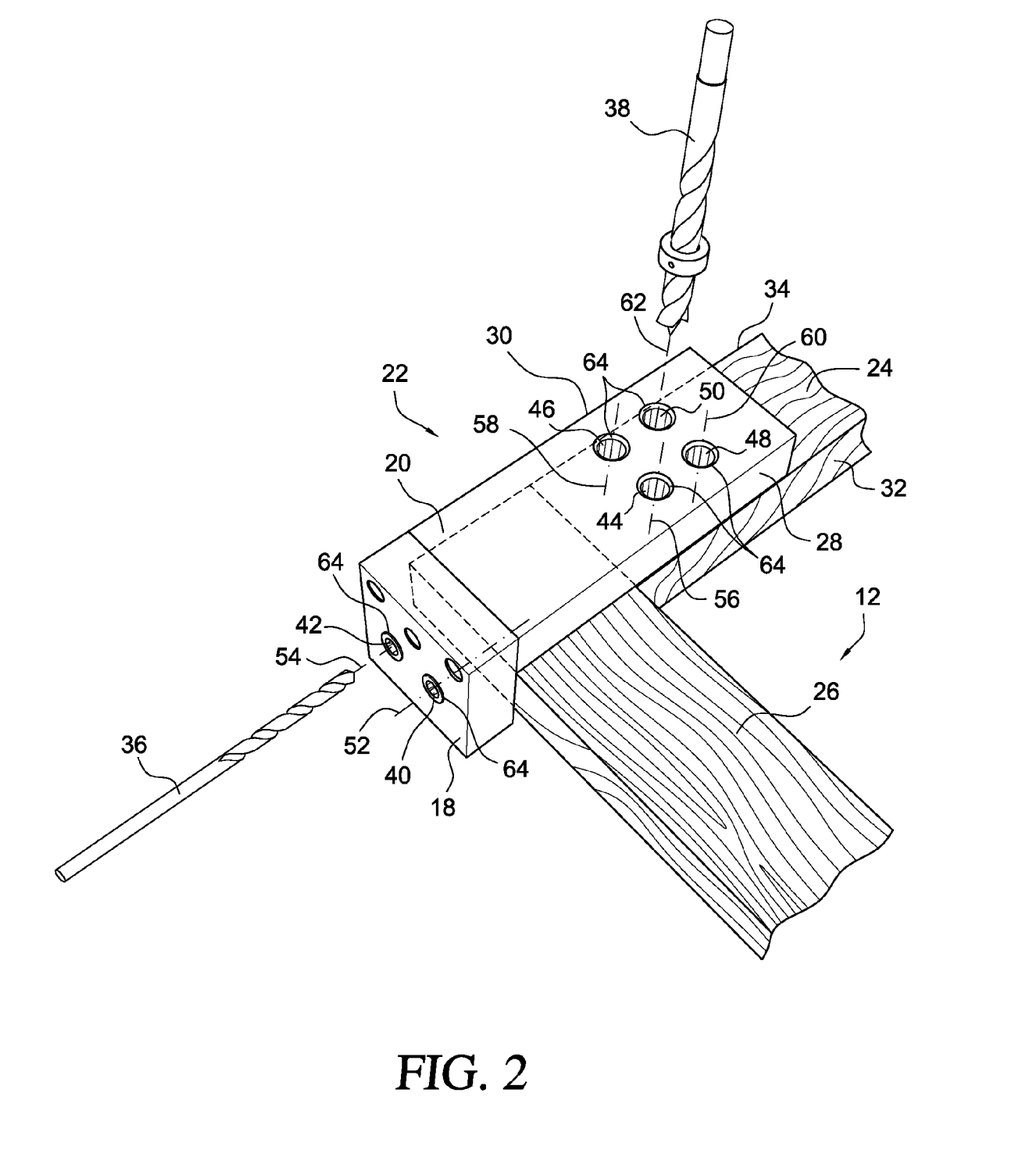
FIG. 2 is a similar view to FIG. 1 but showing two drill bits aligned with a bolt-hole guide and a barrel-nut hole guide of the jig.
Figure 3:
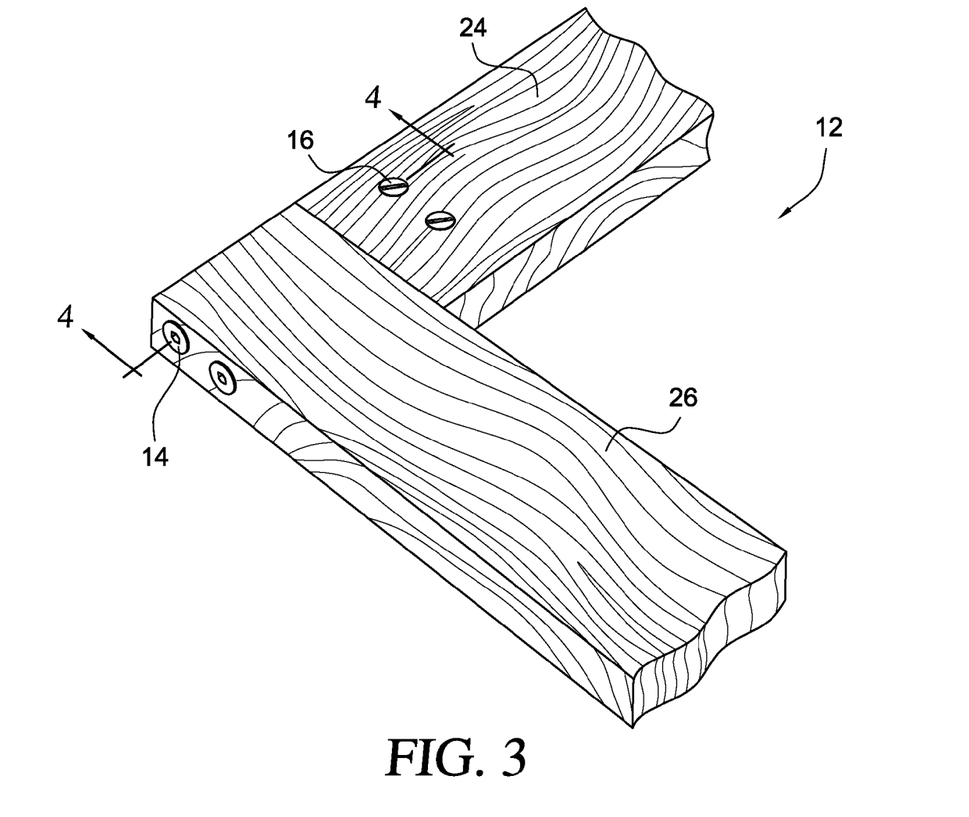
FIG. 3 is a perspective view of the work piece showing a bolt disposed through a bolt-hole and engaging a barrel-nut disposed through a barrel-nut hole.
Figure 4:
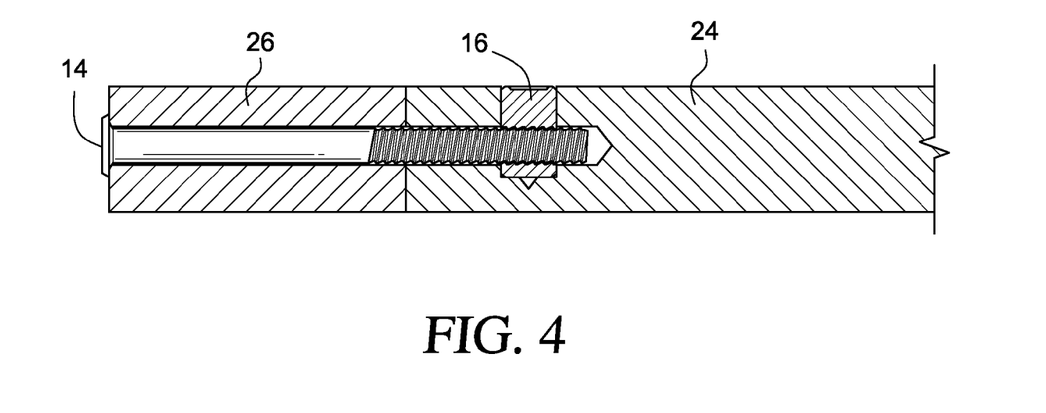
FIG. 4 is a cross sectional view of the work piece shown in FIG. 3, taken along lines 4-4 of FIG. 3.

In an embodiment of the invention, the jig 10 is sized to have a width corresponding to a typical width of a rail 24 and stile 26 in frame-and-panel construction cabinetry. That is, cabinetry stock is typically three-quarters (¾) of an inch thick and two and one-half (2.5) inches wide. Therefore, in an embodiment of the invention, the template portions 18, 20 of the jig 10 are approximately 2.5 inches wide so that the perimeter edges 28, 30 of the jig 10 are flush, or in alignment, with the a portion of a perimeter 32, 34 of the work piece 12, respectively. However, it should be appreciated by those having ordinary skill that the jig 10 can be sized to align with cabinetry stock or work pieces of any width.

The template portions 18, 20, each include apertures, or guides, for the insertion of drill bits 36, 38. In one configuration, the template portion 18 includes two bolt-hole guides 40, 42 oriented horizontally and the template portion 20 includes four barrel-nut guides 44, 46, 48, 50. It should be appreciated that although six apertures are shown in this configuration, a greater or a fewer number of apertures can be included in the template portions 18, 20 for forming a desired number of holes in the work piece 12. The bolt-hole guides 40, 42 are disposed along axes 52, 54, respectively. The axis 52 is intersecting and orthogonal to a set of axes 56, 60 of barrel-nut guides 44, 48. The axis 54 is intersecting and orthogonal to a set of axes 58, 62 of barrel-nut guides 46, 50. Generally, the bolt-hole guides 40, 42 are sized to receive the drill bit 36 for drilling at least one bolt-hole into the work piece 12 and the barrel-nut guides 44, 46, 48, and 50 are sized to receive a drill bit 38 for drilling at least one barrel-nut hole into the work piece 12. Each of the bolt-hole guides and barrel-nut guides 40, 42, 44, 46, 48, and 50 can include a bushing 64 to prevent the guides 40, 42, 44, 46, 48, and 50 from being distorted and/or re-sized during the drilling process.

Figure 5:
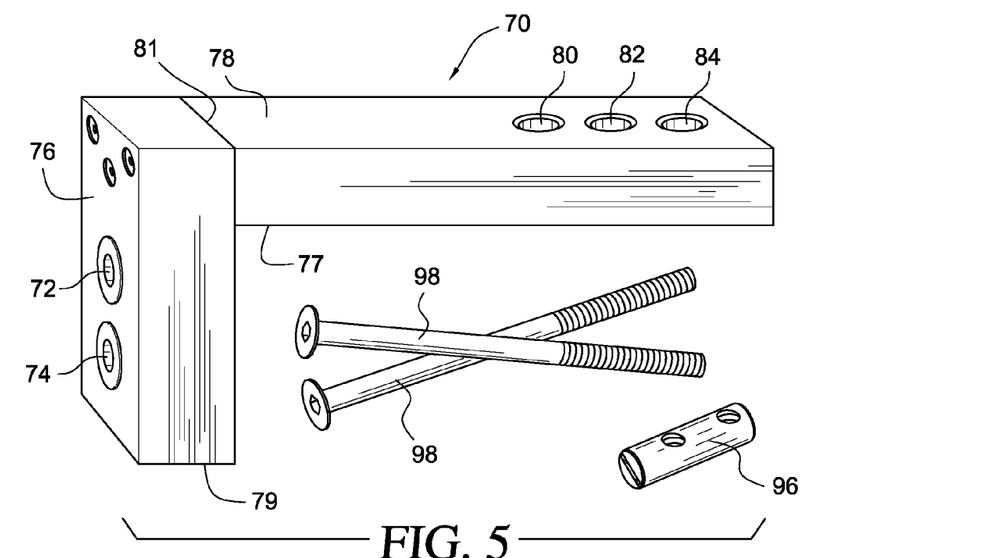
FIG. 5 is a perspective view of another embodiment of the jig for drilling intersecting holes in a work piece.
Figure 6:
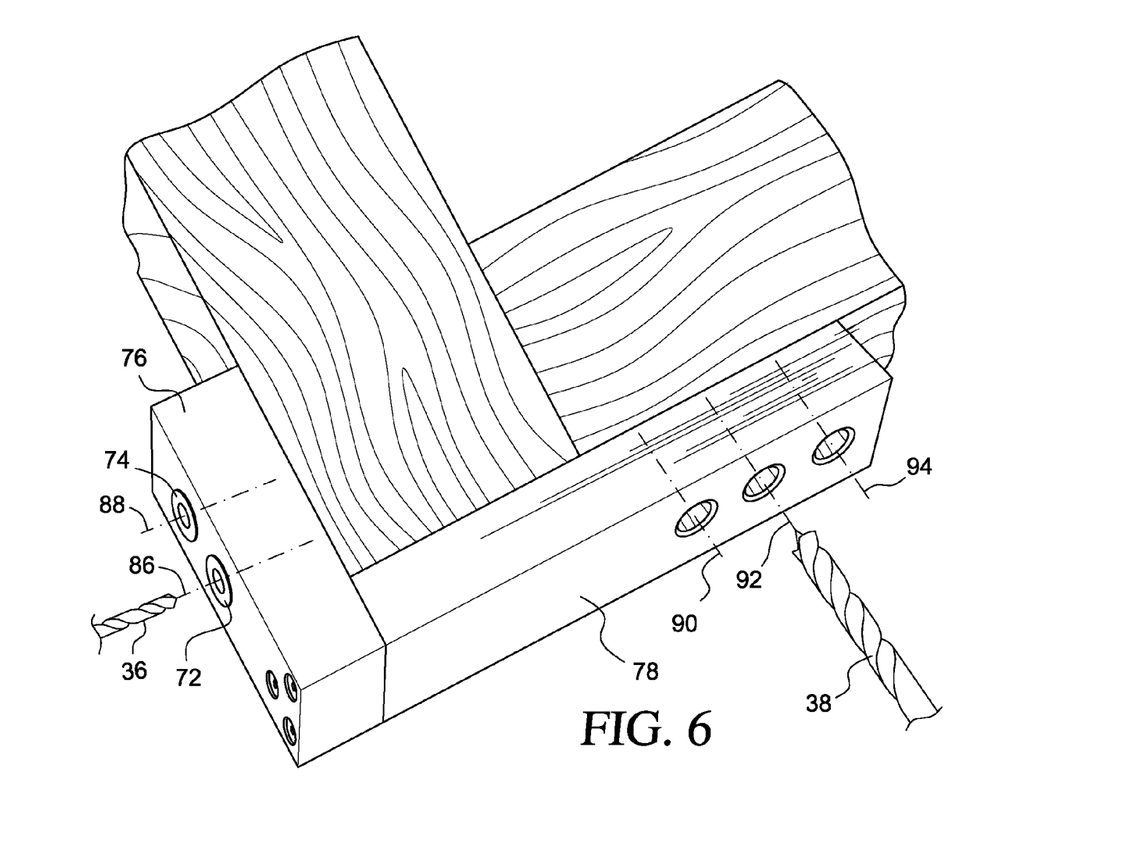
FIG. 6 is a perspective view similar view to FIG. 5, but showing two drill bits aligned with a bolt-hole guide and a barrel-nut hole guide of the jig.

In another configuration, a jig 70 includes two bolt-hole guides, 72, 74 vertically oriented in template portion 76. A template portion 78 includes at least, for example, three barrel-nut guides 80, 82, 84. It should be appreciated that although two bolt-hole guides 72, 74 and three barrel-nut guides 80, 82, 84 are shown in this configuration, a greater or a fewer number of guides can be included in the template portions 76, 78 for forming a desired number of holes in the work piece 12. The bolt-hole guides 72, 74 are disposed along axes 86, 88, respectively, and are intersecting and orthogonal to a set of axes 90, 92, 94 of barrel-nut guides 80, 82, 84, respectively. Generally, the bolt-hole guides 72, 74 are sized to receive the drill bit 36 for drilling at least one bolt-hole into the work piece 12 and the barrel-nut guides 80, 82, 84 are sized to receive a drill bit 38 for drilling at least one barrel-nut hole into the work piece 12.

In an embodiment of the invention, the jig 70 is positioned on the work piece as shown in FIG. 6 so that the template portions 76, 78 align with outer perimeter edges of the work piece. The bolt-hole guides 72, 74 each have a diameter of one-quarter (¼) of an inch, wherein bolt-hole guide 72 is approximately three-quarters (¾) of an inch from a bottom portion 77 of template portion 78. Bolt-hole guide 74 is approximately three-quarters (¾) of an inch from a bottom portion 79 of the template portion 76. The length of the template portion 76 from the bottom portion 77 of template portion 78 to the bottom portion of template portion 76 is approximately two and one-half (2½) inches. The barrel-nut holes 80, 82, 84 are approximately seven-sixteenths (7/16) of an inch in diameter and are spaced from an edge 81 of template portion 78 at approximately three and one-half (3½) inches, four and one-half (3½) inches, and five and one-half (3½) inches, respectively. Preferably, the width of the template portions 78, 76 are three-quarters (¾) of an inch to accommodate cabinetry stock which is typically three-quarters (¾) of an inch thick and two and one-half (2.5) inches wide.

In operation, the jig 10 is first positioned on the work piece 12. For example, the jig edges 28, 30 are aligned with the edges 32, 34 of the work piece 12, respectively. Then, the drill bit 36 is inserted into bolt-hole guide 40 and a first bolt-hole is drilled into the work piece 12. In some embodiments, the drill bit 36 is additionally, or alternatively, inserted into bolt-hole guide 42 of template portion 18 and a bolt-hole is drilled into the work piece 12. If a hole is drilled using the bolt-hole guide 40, then the second drill bit 38 is inserted into either barrel-nut guide 44 or 46 to form a barrel-nut hole intersecting with the bolt-hole at a preferred distance. If a hole is drilled into the work piece 12 using the bolt-hole guide 42 as a guide, then the second drill bit 38 is inserted into either barrel-nut guide 44 or 46 to form a barrel-nut hole intersecting with the bolt-hole at a preferred distance. The drill bits 36, 38 can include stop collars 60 to allow the bolt-holes and the barrel-nut holes to be drilled in the work piece at a predetermined depth. It should be understood that the second drill bit 38 is typically larger in diameter than the first drill bit 36 to form barrel-nut holes in the work piece 12 that are larger in diameter than the bolt-holes formed by the first drill bit 36.

The jig 70 is similarly operated, except the operator drills one or two bolt-holes using the bolt-hole guides 72, 74 and then preferably drills one barrel-nut hole 80, 82, or 84. If two bolt-holes are drilled, then barrel-nut 96 can be inserted into the barrel-nut hole and two bolts 98 can be inserted through the bolt-holes and screwed into the barrel-nut 96.

Figure 7:
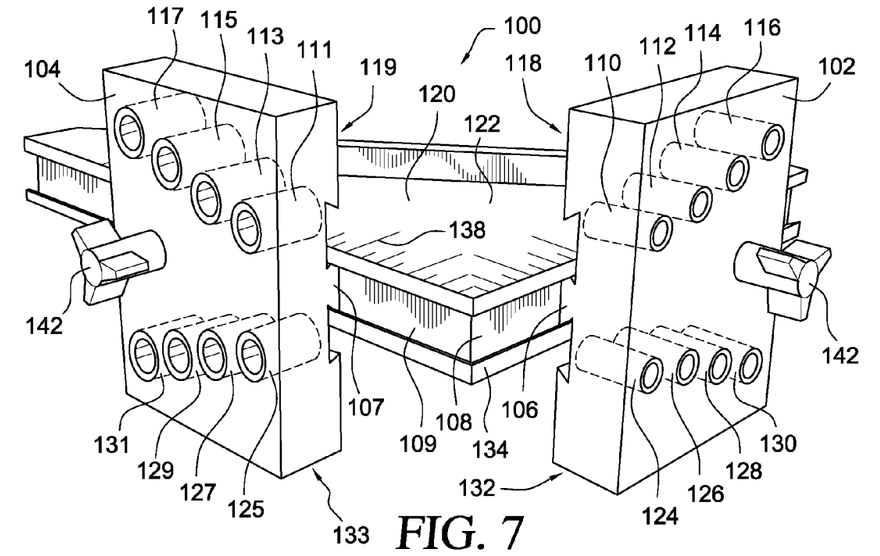
FIG. 7 is a perspective view of another embodiment of the jig for drilling intersecting holes in a work piece.
Figure 8:
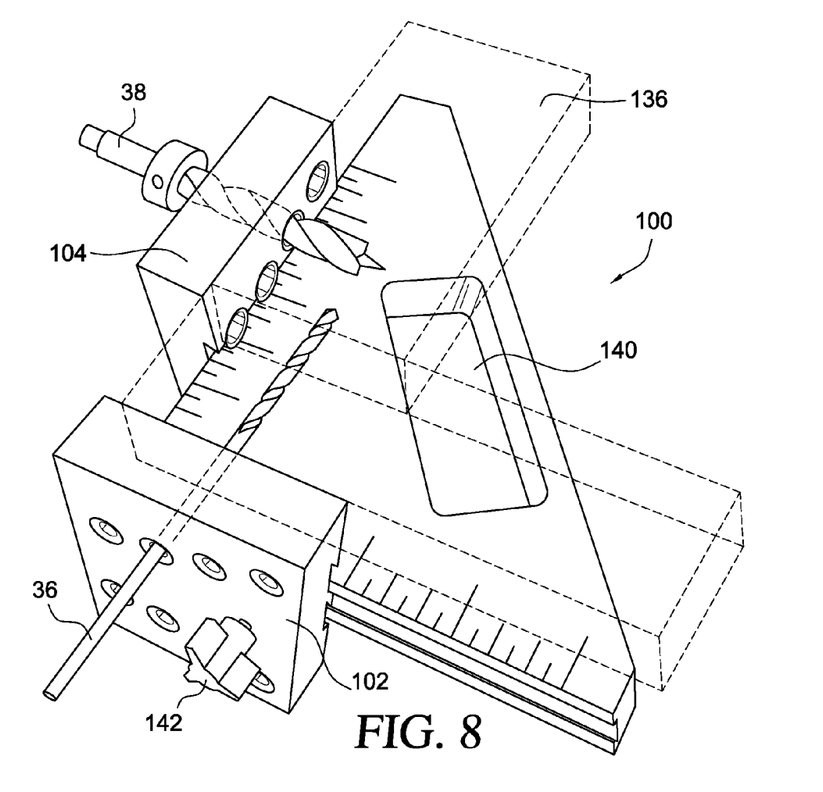
FIG. 8 is a perspective view similar to FIG. 7, but showing two drill bits aligned with a bolt-hole guide and a barrel-nut hole guide of the jig and drilling two intersecting holes into the work piece.

FIGS. 7 and 8 are perspective views of the second embodiment of the present invention showing mechanical jig 100 having movable templates 102, 104. In one configuration, template 102 includes a dove tail joint 106 which is slidably engaged with a dove tail groove 108. The templates 102, 104 further include upper sets of bolt-hole guides and corresponding barrel-nut guides 110, 111, and 112, 113, and 114, 115, and 116, 117, wherein each set of guides 110, 111, and 112, 113, and 114, 115, and 116, 117 is located along an upper portion 118, 119 of each template 102, 104. The guide sets 110, 111, and 112, 113, and 114, 115, and 116, 117 are each disposed at different heights from a top portion 120 of the base 122. It should be appreciated that the bolt-hole guides and the corresponding barrel-nut hole guides in each upper set, however, are disposed at the same height from the top portion 120 of the base 122. For example, guide sets 110, 111 are positioned at the same height. In one configuration, the templates 102, 104 also include lower sets of bolt-hole guides and corresponding barrel-nut guides 124, 125, and 126, 127, and 128, 129 and 130, 131, wherein each set of guides 124, 125, and 126, 127, and 128, 129 and 130, 131 is located along a lower portion 132, 133 of the templates 102, 104 and is disposed at different heights from a bottom portion 134 of the base 122, and wherein each guide in each set is located at the same height. By "base," it is meant a support that participates in the alignment of the work piece. For example, the jig 100 may be place on top of the work piece such that the base 122 is above the work piece. Alternatively, the jig 100 may be placed below the work piece such that the base 122 is below the work piece.

These bolt-hole guides 110, 112, 114, 116, 124, 126, 128 and 130 and these barrel-nut guides 111, 113, 115, 117, 125, 127, 129 and 131 correspond with the center of work pieces having various thicknesses. That is, for example, in an embodiment of the invention, the center of the bolt-hole guides and barrel-nut guides are positioned approximately at three-eights (⅜) of an inch, one-half (½) of an inch, three-quarters (¾) of an inch, and one (1) inch from a top portion 120 of the base 122. Thus, if the work piece 136 is three-quarters (¾) of an inch thick, the center of the work piece 136 would be at three-eights (⅜) of an inch and therefore the first bolt-hole guide 110 or 124 and barrel-nut guide 111 or 125, which is centered at three-eights (⅜) of an inch in this example, would be selected by the operator. Similarly, if the work piece 136 is one (1) inch thick, the center of the work piece 136 would be one-half (½) inch and either bolt-hole guide 112 or 126 and either barrel-nut guide 113 or 127 would be selected by the operator. It should be appreciated that having upper and lower sets of guides in the templates 102, 104 provides a reversible device and allows any side of a corner to be assembled using the present invention.

In one configuration, the base 122 is marked with calibrations 138 and indicia in centimeters or inches. The base 122 can also include a handle 140 as shown, such that one can grip and support the base 122 as needed.

The templates 102, 104 can also include a locking mechanism 142, wherein the templates 102, 104 are to be slidably engaged along the dove tail grooves 107, 109 and then locked into a desired position.

Figure 9:
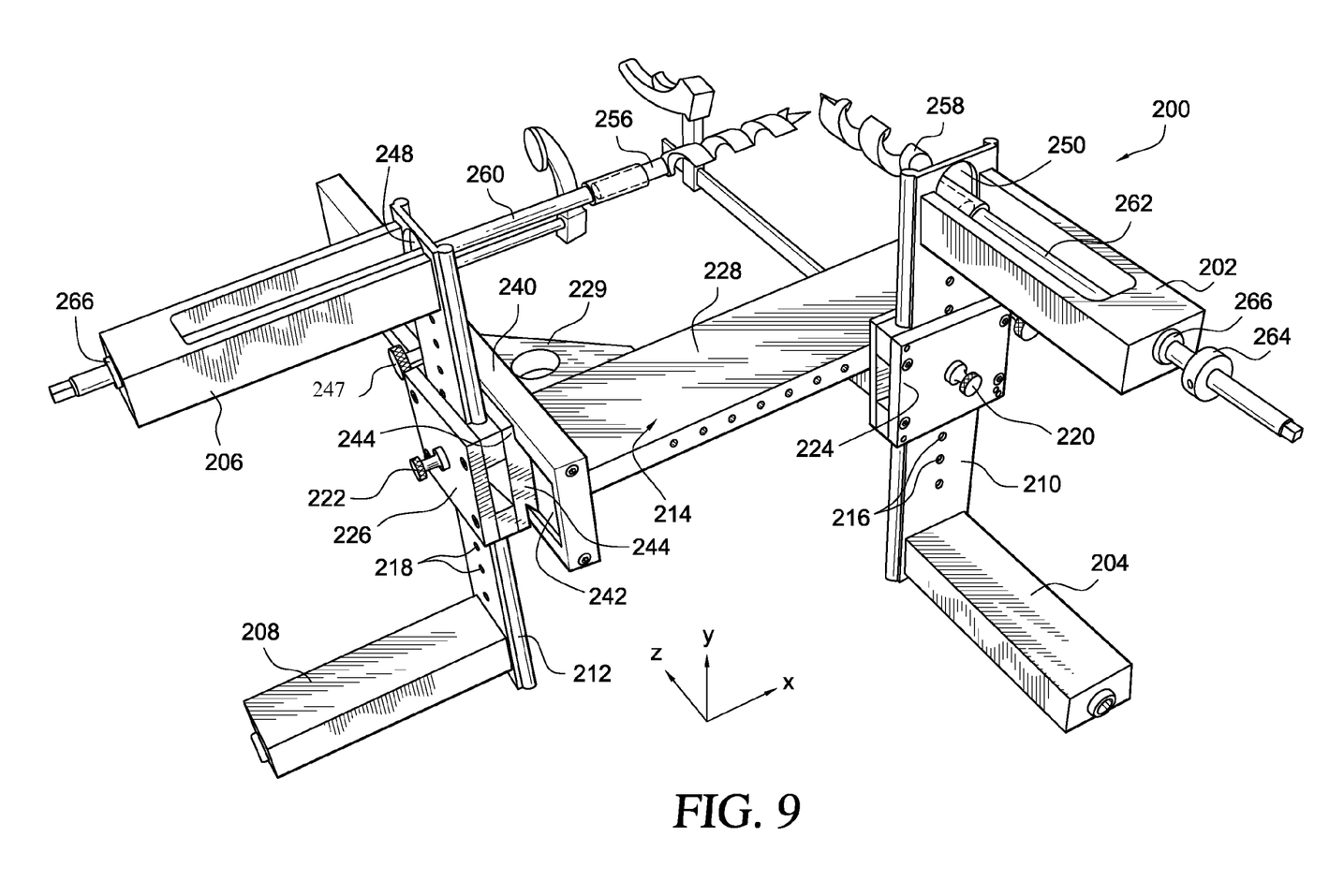
FIG. 9 is a perspective view of yet another embodiment of the jig for drilling intersecting holes in a work piece.
Figure 10:
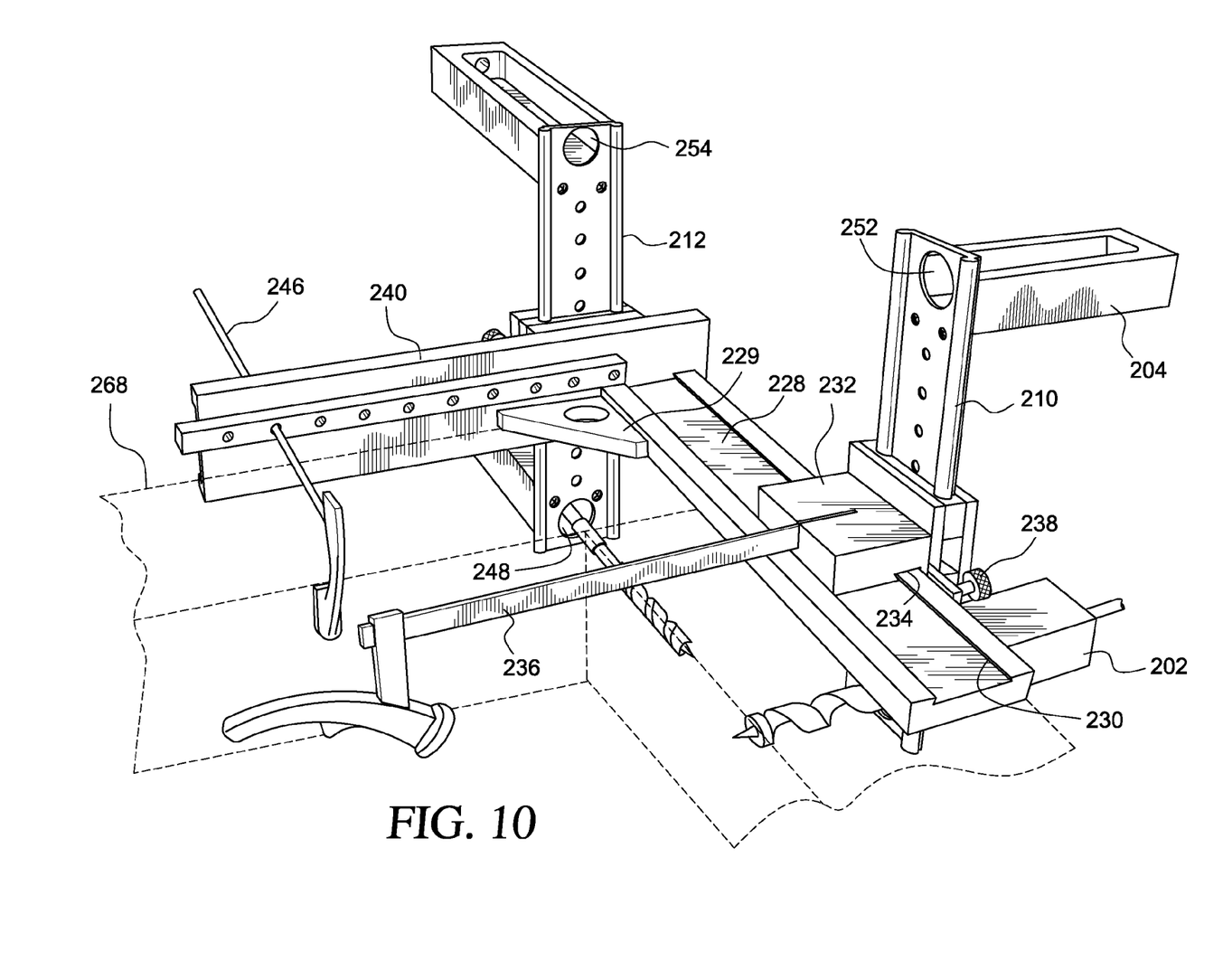
FIG. 10 is a front perspective view of the present invention showing two drill bits aligned with a bolt-hole guide and a barrel-nut hole guide of the jig and drilling two intersecting holes into the work piece.

In yet another embodiment of the invention, the jig 200 includes mounting blocks 202, 204, 206, 208, templates 210, 212, and a mounting base 214. This embodiment is useful for securing abutting joints and especially for joints in timber frame structures and post and beam construction. Each template 210, 212 is slidable latitudinally and longitudinally relative to the base 214. That is, the templates 210, 212 each include a set of apertures 216, 218 for receiving pins 220, 222, respectively. The templates 210, 212 can be translated upwardly and downwardly along the y-axis, and then locked in the desired position, by inserting pins 220, 222 into one of the apertures 216, 218 in the templates 210, 212. The pins 220, 222 are secured in slide mounting blocks 224, 226, respectively. The slide mounting block 224 connects the template 210 and the base 214. It should be appreciated that the base 214 includes a slide 228 and a connector 229. The slide 228 includes a dove tail groove 230 for slidably engaging a block 232 having a dove tail joint 234. In one configuration, a clamp 236 is mounted to the block 232. The slide 228 permits the slide mounting block 224 and template 210 to be translated along the x-axis. The slide 228 can be locked in the desired position via pin 238.

The jig 200 is also moveable along a z-axis via slide 240 which includes a dove tail groove 242 for slidably engaging a block 244 having a dove tail joint 244. In one embodiment, a clamp 246 is mounted to the slide 240. The slide 240 can be locked in the desired position via pin 247.

Thus, it should be appreciated by those having ordinary skill that the templates 210, 212 are moveable along three mutually orthogonal axes of the base 214. However, in one configuration, the templates 210, 212 and slides 228, 240 can be fixed, wherein the jig is not adjustable. In this configuration, the slides 228, 240 can be replaced with blocks (not shown).

In one embodiment of the invention, the templates 210, 212 include apertures 248, 250, 252, 254 having the same diameter. The apertures 248, 250, 252, 254 are disposed to receive drill bits 256, 256 connected to extensions 260, 262, which are retained by drill bit bushings 266. In another embodiment, the apertures 248, 250, 252, 254 are barrel-nut hole guides and bolt-hole guides as described below.

That is, the templates 210, 212 can include at least one barrel-nut hole guide 250 and at least one bolt-hole guide 248, respectively. In an embodiment of the invention, template 210 also includes barrel-nut hole guides 252 and template 212 includes bolt-hole guide 254. The bolt-hole guides 248, 254 are sized to receive drill bit 256 which can be secured in mounting block 206 or 208. The barrel-nut guides 250, 252 are sized to receive drill bit 258 which can be secured in mounting block 202 or 204. Preferably, the diameter of the barrel-nut guides 250, 252 and the drill bit 258 is larger than the diameter of the bolt-hole guides 248, 254 and the drill bit 256. The drill bits 256, 258 can be extended by extensions 260, 262 if necessary. The extensions 260, 262 can be marked with calibrations and indicia in centimeters or inches to indicate how deep a hole is drilled. Thus, the operator can stop drilling when the desired depth is reached. Also, a stop collar 264 can be placed on the extensions 260, 262 or, if appropriate, the drill bits 256, 258 to prevent drilling beyond a predetermined distance. It should be appreciated that the jig 200 can be positioned on top of a work piece or underneath a work piece.

In user, an operator selects a desired barrel-nut and bolt size. Drill bits 256, 258 corresponding to the bolt size and barrel-nut size, respectively, are then selected. Then, drill bits 256, 258 are connect to drill bit extensions 260, 262 and are then inserted into the mounting blocks 202 and 206 and through drill bit bushings 266. The jig 200 is placed on the work piece 268, wherein the slides 228, 240 are flush against the work piece 268 as shown in FIG. 10. The templates 210, 212 are set at the same setting establishing identical placement of the holes. The slides 228, 240 are then translated to a desired position. The user then establishes a desired depth of the bolt hole, where the bolt intersects the nut by attaching the stop collar 264 to each of the extensions 260, 262. The clamps 236, 246 are then tightened to secure the jig 200 into position and the bolt-hole and barrel-nut hole are drilled. The jig 200 can be repositioned and additional bolt-holes and barrel-nut holes can be drilled as described above if desired. Finally, the jig 200 is removed and the bolt and barrel-nut are inserted and tightened to secure the joint.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

The invention claimed is:

1. A jig for drilling intersecting holes in a work piece, the jig comprising:
   a base for supporting the work piece;
   a first moveable template operatively coupled to the base and having an upper set of bolt-hole drill guides extending through the template along a first axis, the bolt-hole drill guide having a diameter sized to receive a first drill bit, wherein one of the first template and the base includes a first groove and the other one of the first template and the base includes a first tongue for slideably engaging the first groove; and
   a second moveable template operatively coupled to the base and having an upper set of barrel-nut hole drill guides corresponding to the upper set of bolt-hole drill guides, the barrel-nut hole drill guides extending through the second template along a second axis, perpendicular and intersecting the first axis, the barrel-nut hole drill guides having a diameter larger than the diameter of the bolt-hole drill guides and sized to receive a second drill bit, wherein one of the second template and the base includes a second groove and the other one of the second template and the base includes a second tongue for slideably engaging the second groove, and wherein the individual guides in each of the upper sets are disposed at different heights from a top portion of the base to accommodate different work piece thicknesses.

2. The jig of claim 1, wherein each of the first and second tongues is a dove tail joint and wherein each of the first and second grooves is a dove tail groove, wherein each of the dove tail joints is engaging one of the dove tail grooves located along at least a portion of a perimeter of the base.

3. The jig of claim 1, wherein the first and second templates each comprises a locking mechanism for releasably securing the first and second templates to the base.

4. The jig of claim 1, wherein the first and second templates each further comprise lower sets of bolt-hole drill guides and corresponding barrel-nut hole drill guides, and wherein the individual guides in each of the lower sets are disposed at different heights from a bottom portion of the base to accommodate different work piece thicknesses.

5. The jig of claim 4, wherein the bolt-hole drill guide and the corresponding barrel-nut hole drill guide in each upper set are disposed at the same height from the upper portion of the base.

6. The jig of claim 4, wherein the bolt-hole drill guide and the corresponding barrel-nut hole drill guide in each lower set are disposed at the same height from the lower portion of the base.

7. The jig of claim 4, wherein each of the bolt-hole drill guides and barrel-nut hole drill guides further includes a bushing disposed therein.

8. A jig for drilling intersecting holes in a work piece, the jig comprising:
   a base for supporting the work piece having a top portion and a bottom portion;
   a first moveable template operatively coupled to the base, the first template having an upper set of bolt-hole drill guides extending through the template along a first axis, the bolt-hole drill guides in the upper set spaced at increasing heights from the top portion of the base, and a lower set of bolt-hole drill guides extending through the template along the first axis, the bolt-hole drill guides in the lower set spaced at increasing heights from the bottom portion of the base, each bolt-hole drill guide having a diameter sized to receive a first drill bit, wherein one of the first template and the base includes a first groove and the other one of the first template and the base includes a first tongue for slideably engaging the first groove; and
   a second moveable template operatively coupled to the base, the second template having an upper set of barrel-nut hole drill guides extending through the template along a second axis, perpendicular and intersecting the first axis, the barrel-nut hole drill guides in the upper set spaced at increasing heights from the top portion of the base and corresponding to the spaced heights of the bolt-hole drill guides in the upper set, and a lower set of barrel-nut hole drill guides extending through the template along the second axis, perpendicular and intersecting the first axis, the barrel-nut hole drill guides in the lower set spaced at increasing heights from the bottom portion of the base and corresponding to the spaced heights of the lower set of bolt-hole drill guides, each barrel-nut hole having a diameter larger than the diameter of the bolt-hole drill guides and sized to receive a second drill bit, wherein one of the second template and the base includes a second groove and the other one of the second template and the base includes a second tongue for slideably engaging the second groove, and wherein the first and second templates each comprises a locking mechanism for releasably securing the first and second templates to the base.

9. The jig for drilling intersecting holes in a work piece of claim 8, wherein each of the bolt-hole drill guides and the barrel-nut hole drill guides further includes a bushing disposed therein.

10. The jig for drilling intersecting holes in a work piece of claim 8, wherein the first and second templates each further comprises a planar mounting surface for receiving the work piece.

* * * * *